United States Patent

[11] 3,624,089

[72] Inventor  Chester E. Pawloski
               Bay City, Mich.
[21] Appl. No. 878,904
[22] Filed     Nov. 21, 1969
[45] Patented  Nov. 30, 1971
[73] Assignee  The Dow Chemical Company
               Midland, Mich.

[54] 1-(2-PROPYNYL)-R-CARBOSTYRIL
     3 Claims, No Drawings
[52] U.S. Cl. .................................... 260/289 R,
                                          71/94, 424/258
[51] Int. Cl. ..................................... C07d 33/46
[50] Field of Search .......................... 260/289,
                                                   289 A

[56]            References Cited
           UNITED STATES PATENTS
3,318,906   5/1967   McKeon et al. ............. 260/289 X
3,555,030   1/1971   Loev et al. .................... 260/289

OTHER REFERENCES

Ralls et al., Chem. Abstr. Vol. 67, Col105 14t.

Primary Examiner—Donald G. Daus
Attorneys—Griswold & Burdick, John L. Spalding and C. Kenneth Bjork ABSTRACT: The present invention is directed to new compounds corresponding to the formula:

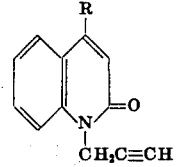

wherein R is hydrogen or lower alkyl groups of from one to about four, both inclusive, carbon atoms. The new compounds of the present invention are suitable for use as herbicides and fungicides, and exhibit depressant activity on the central nervous system.

1-(2-PROPYNYL)-R-CARBOSTYRIL

SUMMARY

The present invention is directed to new compounds having the formula:

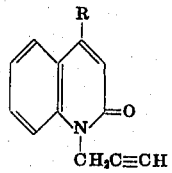

wherein R is hydrogen or lower alkyl groups of from one to about four, both inclusive, carbon atoms. The compounds are tan-brown crystalline solids which are soluble in many common organic solvents and are of low solubility in water. These compounds are useful as herbicides and fungicides, and exhibit depressant activity on the central nervous system.

The compounds are prepared by reacting propargyl bromide with with a corresponding orthohydroxy quinoline compound and potassium carbonate in a solvent such as acetone. The amount of reactants required is not critical, however, optimum yields are obtained when essentially equimolar proportions of the reactants are utilized.

As used herein, the term "lower alkyl" means saturated, monovalent aliphatic radicals including straight and branched-chain radicals of from one to about four carbon atoms, as illustrated by, but not limited to, methyl, ethyl, propyl, isopropyl, butyl, sec.-butyl, and the like.

Usually, in carrying out the reaction, the reactants are contacted in any convenient manner and the resulting mass is heated at a temperature of from about 60° to about 90° C.; however, the reaction mass may also be maintained at its reflux temperature under atmospheric pressure. The reaction mass is maintained at the temperature desired for a period of time sufficient to assure substantial completion of the reaction. Generally, the reaction period ranges from about 20 to about 28 hours. The reaction mass may be agitated, generally by a rocking or stirring motion, during the reaction period.

Upon completion of the reaction, the compounds are recovered by using conventional procedures, such as filtration and/or evaporation of solvent or carrier liquids therefrom.

DESCRIPTION OF PREFERRED EMBODIMENTS

The following examples illustrate the practice of the present invention and will enable those skilled in the art to practice the same.

EXAMPLE 1: 1-(2-Propynyl)-Carbostyril

2-Quinolinol (10 grams; 0.069 mole); propargyl bromide (about 8 grams; 0.069 mole) and potassium carbonate (about 10 grams; 0.069 mole) were dispersed in about 30 milliliters of acetone and placed in a glass reactor capable of withstanding low pressures. The reaction mass was heated to about 75° C. under autogenous pressure for approximately 24 hours and was agitated by a rocking motion throughout the reaction period. The reaction mass was filtered to remove byproduct solids while still hot and acetone was evaporated from the filtrate leaving the solid, crystalline product. The 1-(2-propynyl)-carbostyril was recovered as a tan, crystalline solid having a melting point of 118° C.; its structure was confirmed by infrared spectroscopy analysis.

EXAMPLE 2: 1-(2-propynyl)-4-methyl-carbostyril

2-Hydroxy-4-methylquinoline (53 grams; 0.33 mole); propargyl bromide (40 grams; 0.33 mole) and potassium carbonate (46 grams; 0.33 mole) were dispersed in 300 milliliters of acetone. The reaction mass was stirred and heated to its reflux temperature at atmospheric pressure and maintained under these conditions for a period of about 24 hours. The reaction mass was filtered to remove byproduct solids while still hot and the acetone evaporated from the filtrate, leaving the solid brown crystalline product. The recovered 1-(2-propynyl)-4-methyl-carbostyril melted at 147°–150° C.; its structure was confirmed by infrared spectroscopy analysis.

The compounds of the present invention are suitable for use as herbicides and fungicides. For such uses, the compounds can be employed in an unmodified form or dispersed on a finely divided solid and employed as dusts. Such mixtures can also be dispersed in water with or without the aid of a surface active agent, and the resulting aqueous suspensions employed as sprays. In other procedures, the products are employed as active constituents in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions.

The compounds of the present invention and the compositions containing these compounds are introduced into the various environments by such conventional techniques as spraying, dusting and drenching. The exact concentration of the novel compounds to be employed in the treating compositions is not critical and may vary considerably provided the required amount of effective agent is supplied on the plant, plant part, soil aqueous and the like environments.

In a representative operation, the 1-(2-propynyl)-carbostyril compound in a concentration of 10 parts per million in an aqueous solution or dispersion was found to give 100 percent control of *Lysimachia nummularia* (moneywort).

The same compound was found to give substantially complete control of bean mildew when an aqueous solution containing 4 parts per million was applied to bean plants which were subsequently inoculated with spores of the bean mildew organism.

The carbostyril compounds of the present invention also have central nervous system activity as indicated by their effectiveness in prolonging hexobarbital sleep time in mice. In these determinations, mice received a dosage of one of the carbostyril compounds at a rate equivalent to 75 milligrams per kilogram body weight one hour before intraperitoneal administration of hexobarbital at a dosage rate equivalent to 100 milligrams per kilogram body weight. Untreated control mice were similarly injected with hexobarbital at a dosage rate equivalent to 100 milligrams per kilogram body weight to serve as control checks. The hexobarbital injections induced sleep in the mice. All animals were then placed on their backs and the period of time until each mouse spontaneously turned over and righted itself was recorded as sleep time. The ratio of the average sleep time for the treated mice to that for the untreated mice is expressed as hexobarbital sleep time ratio. Injections of the 1-(2-propynyl)-carbostyril compound produced a hexobarbital sleep time ratio of 2.9.

The 1-(2-propynyl)-carbostyril compound was further tested in a hexobarbital resleep test. In these determinations, mice were injected intraperitoneally with the equivalent of 100 milligrams per kilogram body weight of a freshly prepared aqueous solution of sodium hexobarbital. The hexobarbital injections induced sleep in the mice, and all mice were placed on their backs. As each mouse spontaneously righted itself, it was injected intraperitoneally with the equivalent of 75 milligrams per kilogram body weight of the 1-(2-propynyl)-carbostyril compound. Of the mice tested, 80 percent again lost the righting reflex and returned to sleep.

I claim:

1. Carbostyril compounds corresponding to the formula:

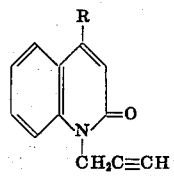

wherein R is hydrogen or lower alkyl groups of from one to about four, both inclusive, carbon atoms.

2. The compound claimed in claim 1, which is 1-(2-propynyl)-4-methyl-carbostyril.

3. The compound claimed in claim 1, which is 1-(2-propynyl)-carbostyril.